US010338669B2

(12) United States Patent
Luo et al.

(10) Patent No.: US 10,338,669 B2
(45) Date of Patent: Jul. 2, 2019

(54) CURRENT SENSE ACCURACY IMPROVEMENT FOR MOSFET RDS (ON) SENSE BASED VOLTAGE REGULATOR BY ADAPTIVE TEMPERATURE COMPENSATION

(71) Applicant: DELL PRODUCTS, L.P., Round Rock, TX (US)

(72) Inventors: Shiguo Luo, Austin, TX (US); Kejiu Zhang, Round Rock, TX (US); Feng-Yu Wu, Taipei (TW)

(73) Assignee: Dell Products, L.P., Round Rock, TX (US)

( * ) Notice: Subject to any disclaimer, the term of this patent is extended or adjusted under 35 U.S.C. 154(b) by 46 days.

(21) Appl. No.: 14/924,644

(22) Filed: Oct. 27, 2015

(65) Prior Publication Data

US 2017/0115725 A1 Apr. 27, 2017

(51) Int. Cl.
*G06F 1/32* (2019.01)
*G06F 1/20* (2006.01)
*G06F 1/3296* (2019.01)
*G06F 1/3206* (2019.01)

(52) U.S. Cl.
CPC .......... *G06F 1/3296* (2013.01); *G06F 1/206* (2013.01); *G06F 1/3206* (2013.01); *Y02D 10/16* (2018.01); *Y02D 10/172* (2018.01)

(58) Field of Classification Search
CPC .................. G06F 1/3296; G06F 1/3206
See application file for complete search history.

(56) References Cited

U.S. PATENT DOCUMENTS

| 5,339,018 | A  | * | 8/1994 | Brokaw ............... H02J 7/0091 320/147 |
| 5,629,612 | A  | * | 5/1997 | Schaffer .................. G05F 3/267 323/313 |
| 6,618,684 | B1 | * | 9/2003 | Beroset ............... G01R 11/185 702/99 |
| 6,946,897 | B2 |   | 9/2005 | Pearcce |
| 7,262,628 | B2 | * | 8/2007 | Southwell ........... H02M 3/1584 323/266 |
| 7,334,418 | B2 |   | 2/2008 | Henry et al. |
| 7,358,710 | B2 |   | 4/2008 | Luo et al. |
| 7,464,277 | B2 |   | 12/2008 | Prosperi et al. |

(Continued)

*Primary Examiner* — Jaweed A Abbaszadeh
*Assistant Examiner* — Cheri L Harrington
(74) *Attorney, Agent, or Firm* — Isidore PLLC

(57) ABSTRACT

An information handling system (IHS) includes temperature-compensated power control by a voltage regulation (VR) module to: (i) receive a monitored current (Imon) value from a current sensor integrated into the VR module; (ii) receive a temperature value from the temperature sensor also integrated into the VR module; (iii) determine a temperature-compensated Imon value based at least in part on the Imon value, the temperature value, and an empirically-derived temperature coefficient defined at the Imon value and the temperature value; and (iv) control the voltage-regulated power at least in part based on the temperature-compensated Imon value. The empirically-derived temperature coefficient adjusts for nonlinear portions of temperature coupling relationship between a portion of an integrated circuit (IC) die that can include the current sensor and the temperature sensor and a temperature experienced by by active portion of VR module.

16 Claims, 10 Drawing Sheets

(56) References Cited

U.S. PATENT DOCUMENTS

| | | | |
|---|---|---|---|
| 8,451,153 B1 | 5/2013 | Lakshmikanthan et al. | |
| 8,734,006 B2 | 5/2014 | Crafts et al. | |
| 8,959,377 B2 | 2/2015 | Li | |
| 2006/0265167 A1* | 11/2006 | Laraia | G01D 3/0365 702/99 |
| 2009/0063081 A1* | 3/2009 | Xu | G01D 3/022 702/107 |
| 2009/0146635 A1* | 6/2009 | Qiu | H02M 3/156 323/290 |
| 2010/0225287 A1* | 9/2010 | Schultz | H02J 3/1842 323/272 |
| 2011/0109373 A1 | 5/2011 | Chen et al. | |
| 2012/0161741 A1* | 6/2012 | Zambetti | G05F 3/245 323/294 |
| 2013/0058378 A1* | 3/2013 | Zambetti | G01K 7/24 374/185 |
| 2015/0280563 A1* | 10/2015 | Tang | H02M 3/158 323/271 |
| 2015/0349634 A1* | 12/2015 | Tschirhart | G01R 19/32 323/271 |
| 2016/0241186 A1* | 8/2016 | Motz | G01D 3/02 |

\* cited by examiner

| Coupling Coefficients | | Temperature coupling coefficients(TCC) and Offset under different temperatures for different vendor's Pstage | | | | | |
|---|---|---|---|---|---|---|---|
| Vendor | Pstage ID | T1 | T2 | T3 | T4 | ... | Tn |
| TI Pstage | 3.3V | TCC$_{A1}$/OFFSET$_{A1}$ | TCC$_{A2}$/OFFSET$_{A2}$ | TCC$_{A3}$/OFFSET$_{A3}$ | TCC$_{A4}$/OFFSET$_{A4}$ | ... | TCC$_{An}$/OFFSET$_{An}$ |
| FCS Pstage | 2.1V | TCC$_{B1}$/OFFSET$_{B1}$ | TCC$_{B2}$/OFFSET$_{B2}$ | TCC$_{B3}$/OFFSET$_{B3}$ | TCC$_{B4}$/OFFSET$_{B4}$ | ... | TCC$_{Bn}$/OFFSET$_{Bn}$ |
| IR Pstage | 1.2V | TCC$_{C1}$/OFFSET$_{C1}$ | TCC$_{C2}$/OFFSET$_{C2}$ | TCC$_{C3}$/OFFSET$_{C3}$ | TCC$_{C4}$/OFFSET$_{C4}$ | ... | TCC$_{Cn}$/OFFSET$_{Cn}$ |
| IFX Pstage | 0V | TCC$_{D1}$/OFFSET$_{D1}$ | TCC$_{D2}$/OFFSET$_{D2}$ | TCC$_{D3}$/OFFSET$_{D3}$ | TCC$_{D4}$/OFFSET$_{D4}$ | ... | TCC$_{Dn}$/OFFSET$_{Dn}$ |

CURRENT SENSE ACCURACY IMPROVEMENT FOR MOSFET RDS (ON) SENSE BASED VOLTAGE REGULATOR BY ADAPTIVE TEMPERATURE COMPENSATION

BACKGROUND

1. Technical Field

The present disclosure relates in general to thermal sensing of an integrated circuit of an information handling system (IHS), and more particularly to thermal compensated power management of a central processing unit (CPU) of an IHS.

2. Description of the Related Art

As the value and use of information continue to increase, individuals and businesses seek additional ways to process and store information. One option available to users is information handling systems (IHSs). An IHS generally processes, compiles, stores, and/or communicates information or data for business, personal, or other purposes, thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Servers, which are one type of IHSs, are requiring ever increasing accuracy for power telemetry data to be used in system level power and thermal management algorithms. For instance, the Central Processing Unit (CPU) power management algorithms poll CPU load current information from the Voltage Regulator (VR) module in order to optimize CPU performance versus power consumption while still maintaining safe operation of the system. Power measurement is required from the VR module with data reported over the Serial Voltage Identification (SVID) bus. Accuracy of current sense will directly impact system performance, reliability, and power saving.

BRIEF SUMMARY

In accordance with the teachings of the present disclosure, an information handling system (IHS) includes a temperature-compensated power control. In one or more embodiments, the IHS includes a computing component and a voltage regulation (VR) module. The VR module includes an integrated circuit die. A power stage component contained in the integrated circuit die includes a high side driver and a low side driver, both electrically connected to power the computing component with voltage-regulated power. A current sensor contained in the integrated circuit die measures a monitored current (Imon) value of the voltage-regulated power. A temperature sensor contained in the integrated circuit die measures a temperature value at one location of the integrated circuit die, where a temperature value sensed at the location has a nonlinear temperature coefficient relationship with a second temperature of the high side driver. A VR controller is in communication with the current sensor and the temperature sensor. The VR controller executes instructions to configure the VR controller to: (i) receive the Imon value from the current sensor; (ii) receive the temperature value from the temperature sensor; (iii) determine a temperature-compensated Imon value based at least in part on the Imon value, the temperature value, and an empirically-derived temperature coefficient defined at the Imon value and the temperature value; and (iv) control the voltage-regulated power at least in part based on the temperature-compensated Imon value.

According to illustrative embodiments of the present disclosure, a method of temperature-compensated power control of an IHS. In one or more embodiments, the method includes a VR controller measuring, by a current sensor contained in an integrated circuit die, a monitored current (Imon) value of voltage-regulated power by a power stage. The power stage has a high side driver and a low side driver contained in the integrated circuit die. The method includes the VR controller measuring, via a temperature sensor, a temperature value at one location of the integrated circuit die having a nonlinear temperature coefficient with the high side driver. The method includes the VR controller retrieving an empirically-derived temperature coefficient at the Imon value and the temperature value. The method includes the VR controller determining a temperature-compensated Imon value based at least in part on the Imon value and the temperature value. The method includes the VR controller controlling a level of the voltage-regulated power at least in part based on the temperature-compensated Imon value.

In accordance with embodiments of the present disclosure, a method is provided of deriving temperature compensation parameters for voltage regulation of an IHS. In one or more embodiments, the method includes a testing system setting current loading of a voltage regulator. The method includes the testing system sampling output voltage of the voltage regulator. The method includes the testing system measuring an average temperature of the voltage regulator. The method includes the testing system forming an output current matrix as an array based on the sampled output voltage and the measured average temperature. The method includes the testing system calculating nonlinear thermal coefficients as a function of current offset based on an average temperature and the output current matrix. The method includes the testing system storing parameters of the thermal coefficient values in a temperature coefficient lookup table.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 7 illustrates a table of empirically-derived data for temperature coupling coefficient developed by the testing system of FIG. 6, according to one or more embodiments;

DETAILED DESCRIPTION

Figure 1:
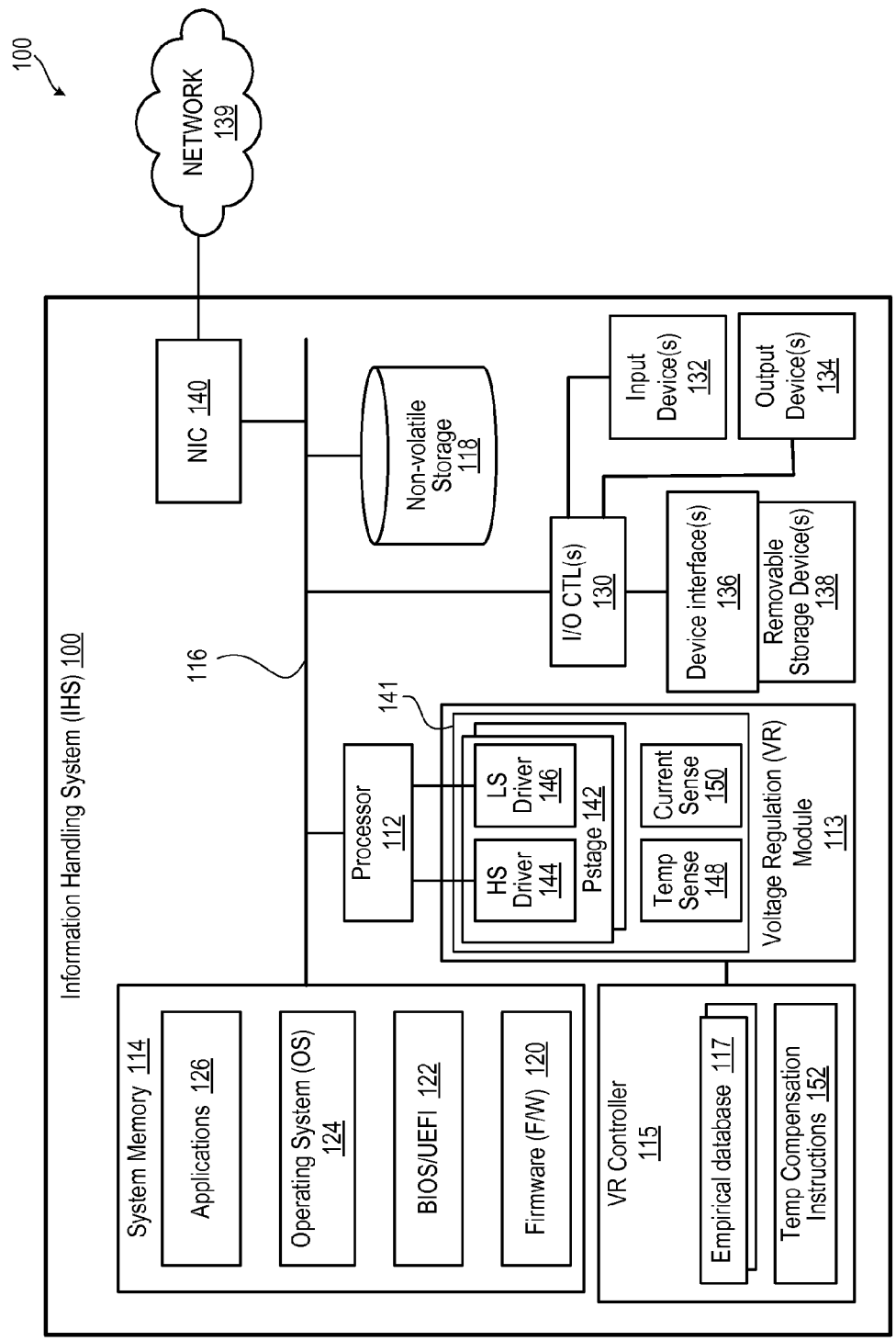
FIG. 1 illustrates a block diagram representation of an example information handling system (IHS) having computing components that are powered by a temperature compensated voltage regulation (VR) module, according to one or more embodiments.

An information handling system (IHS) includes temperature-compensated power control by a voltage regulation (VR) module to: (i) receive a monitored current (Imon) value from a current sensor integrated into the VR module; (ii) receive a temperature value from the temperature sensor also integrated into the VR module; (iii) determine a temperature-compensated Imon value based at least in part on the Imon value, the temperature value, and an empirically-derived temperature coefficient defined at the Imon value and the temperature value; and (iv) control the voltage-regulated power at least in part based on the temperature-compensated Imon value. The empirically-derived temperature coefficient adjusts for nonlinear portions of the temperature coupling relationship between a portion of an integrated circuit (IC) die that can include the current sensor and the temperature sensor and a temperature experienced by an active portion of the VR module.

The present innovation combines improved temperature compensation techniques suitable for voltage regulation (VR) digital controller and key data telemetry. A knowledge base for current monitor (Imon) temperature compensation is developed for power stages that is used to fine tune Imon in real-time. Parametric difference induced by thermal or location variation are determined and stored in a digital controller configuration file. Through software implementation and commands support, the present innovation does not require additional hardware instrumentation than the generally-known instrumentation for measuring current, temperature, etc. The present innovation does not need to occupy system boot period since optimization and operation training are accomplished during a development phase for each identified type of VR module. The present innovation can be applied to multi-sourced power stage (Pstage) devices.

Previous attempts for temperature compensation relied upon a negative temperature coefficient (NTC) resistor and a constant temperature coefficient to cover a whole VR operation range. This generally-known method may be acceptable for inductor Direct Current Resistance (DCR) based current-sense method due to a relatively smaller temperature variation range. However, generally-known methods do not achieve a desired temperature compensation for Pstage based current sense approach over a greater temperature variation range. In particular, improved temperature compensation is required when more than one type of Pstage device can be installed in a given VR module. Remote Temperature Sensing (RTS) and individual vendor designs can introduce differences that result in different temperature coupling coefficients during VR operation.

Proposed methods are based on multiple variables of a pre-optimized empirical database. Adaptive temperature coupling coefficients are determined to achieve a desired temperature compensation characteristics to calibrate nonlinear segments of Imon curve, especially in a heavy load range. Thereby, temperature compensation coefficient for an indirect sensor coupling device is no longer constrained to be a constant for a wide temperature operation range. This compensation will become even more important as central processing units (CPUs) consume greater amounts of power with a corresponding higher temperature for integrated circuits (ICs) that provide power to the CPU.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates a block diagram representation of an example information handling system (IHS) 100 having computing components such as a processor 112 that are powered by a voltage regulation (VR) module 113. An adaptive temperature-compensated VR controller 115 accurately performs temperature compensation that is appropriate for a particular configuration of the VR module 113 by retrieving an empirical database 117. The VR controller 115 receives multiple variables in order to select an appropriate coefficient from the pre-optimized empirical database 117. The VR controller 115 determines adaptive temperature coupling coefficients to achieve desired temperature compensation characteristics to calibrate a nonlinear segment of monitored current (Imon) curve, especially in heavy load range. Within the general context of IHSs, the IHS 100 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

IHS 100 includes at least one central processing unit (CPU) or processor 112 coupled to a system memory 114 via a system interconnect 116. System interconnect 116 can be interchangeably referred to as a system bus, in one or more embodiments. Also coupled to system interconnect 116 is non-volatile storage (e.g., a non-volatile random access memory (NVRAM)) 118, within which can be stored one or more software and/or firmware modules and one or more sets of data that can be utilized during operations of management IHS 100. These one or more software and/or firmware modules can be loaded into system memory 114 during operation of management IHS 100. Specifically, in one embodiment, system memory 114 can include therein a plurality of such modules, including one or more of firmware (F/W) 120, basic input/output system (BIOS) or Uniform Extensible Firmware Interface (UEFI) 122, operating system (OS) 124, and application(s) 126. These software and/or firmware modules have varying functionality when their corresponding program code is executed by CPU 112 or secondary processing devices within management IHS 100. For example, application(s) 126 may include a word processing application, a presentation application, and a management station application, among other applications.

IHS 100 further includes one or more input/output (I/O) controllers 130 which support connection by and processing of signals from one or more connected input device(s) 132, such as a keyboard, mouse, touch screen, or microphone. I/O controllers 130 also support connection to and forwarding of output signals to one or more connected output devices 134, such as a monitor or display device or audio speaker(s). Additionally, in one or more embodiments, one or more device interfaces 136, such as an optical reader, a USB, a card reader, Personal Computer Memory Card International Association (PCMCIA) slot, and/or a high-definition multimedia interface (HDMI), can be associated with IHS 100. Device interface(s) 136 can be utilized to enable data to be read from or stored to corresponding removable storage device(s) 138, such as a compact disk (CD), digital video disk (DVD), flash drive, or flash memory card. In one or more embodiments, device interface(s) 136 can further include general purpose I/O interfaces such as inter-integrated circuit ($I^2C$), system management bus (SMB), and peripheral component interconnect (PCI) buses.

IHS 100 comprises a network interface controller (NIC) 140. NIC 140 enables IHS 100 and/or components within IHS 100 to communicate and/or interface with other devices, services, and components that are located external to IHS 100. These devices, services, and components can interface with IHS 100 via an external network, such as example network 139, using one or more communication protocols that include TCP/IP and NBD protocol. According to one aspect of the disclosure, NIC 140 represents a communication mechanism that enables the IHS to communicate with one or more clients, as described in greater detail hereinafter. Network 139 can be a local area network, wide area network, personal area network, and the like, and the connection to and/or between network and IHS 100 can be wired, wireless, or a combination thereof. For purposes of discussion, network 139 is indicated as a single collective component for simplicity. However, it should be appreciated that network 139 can comprise one or more direct connections to other devices as well as a more complex set of interconnections as can exist within a wide area network, such as the Internet.

The VR module 113 includes an integrated circuit (IC) die 141 onto which is formed at least one power stage component (Pstage) 142 having a high side driver 144 and a low side driver 146, both electrically connected to power a computing component, such as the processor 112, with voltage-regulated power. The VR module 113 can have more than one Pstage 142 to provide different voltage levels for other computing components. In one or more embodiments, the high side driver 144 and the low side driver 146 each are metal-oxide-semiconductor field-effect transistors (MOSFETs). A temperature sensor 148 measures a temperature value at one location of the IC die 141. The temperature value sensed at the location has a nonlinear temperature coefficient relationship with a second temperature of the high side driver 144. In an exemplary embodiment, the temperature sensor 148 can be a thermistor, and the temperature sensor 148 is contained in the IC die 141 at a location proximate to the MOSFET of the low side driver 146. A current sensor 150 is also contained in the IC die 141 to measure a monitored current (Imon) value of the voltage-regulated power provided to the processor 112. In an exemplary embodiment, the current sensor 150 is an inductor Direct Current Resistance (DCR) sense circuit. The VR controller 115 is communicatively coupled with the current sensor 150 and the temperature sensor 148, and the VR controller 115 executes instructions 152 that configure the IHS 100 to: (i) receive the Imon value from the current sensor 150; (ii) receive the temperature value from the temperature sensor 148; (iii) determine a temperature-compensated Imon value based at least in part on the Imon value, the temperature value, and an empirically-derived temperature coefficient defined at the Imon value and the temperature value; and (iv) control the voltage-regulated power at least in part based on the temperature-compensated Imon value. For example, the VR controller 115 can cause an adjustment in a pulse width of a pulse width modulated (PWM) signal at a selected offset and a selected gain.

Figure 2:
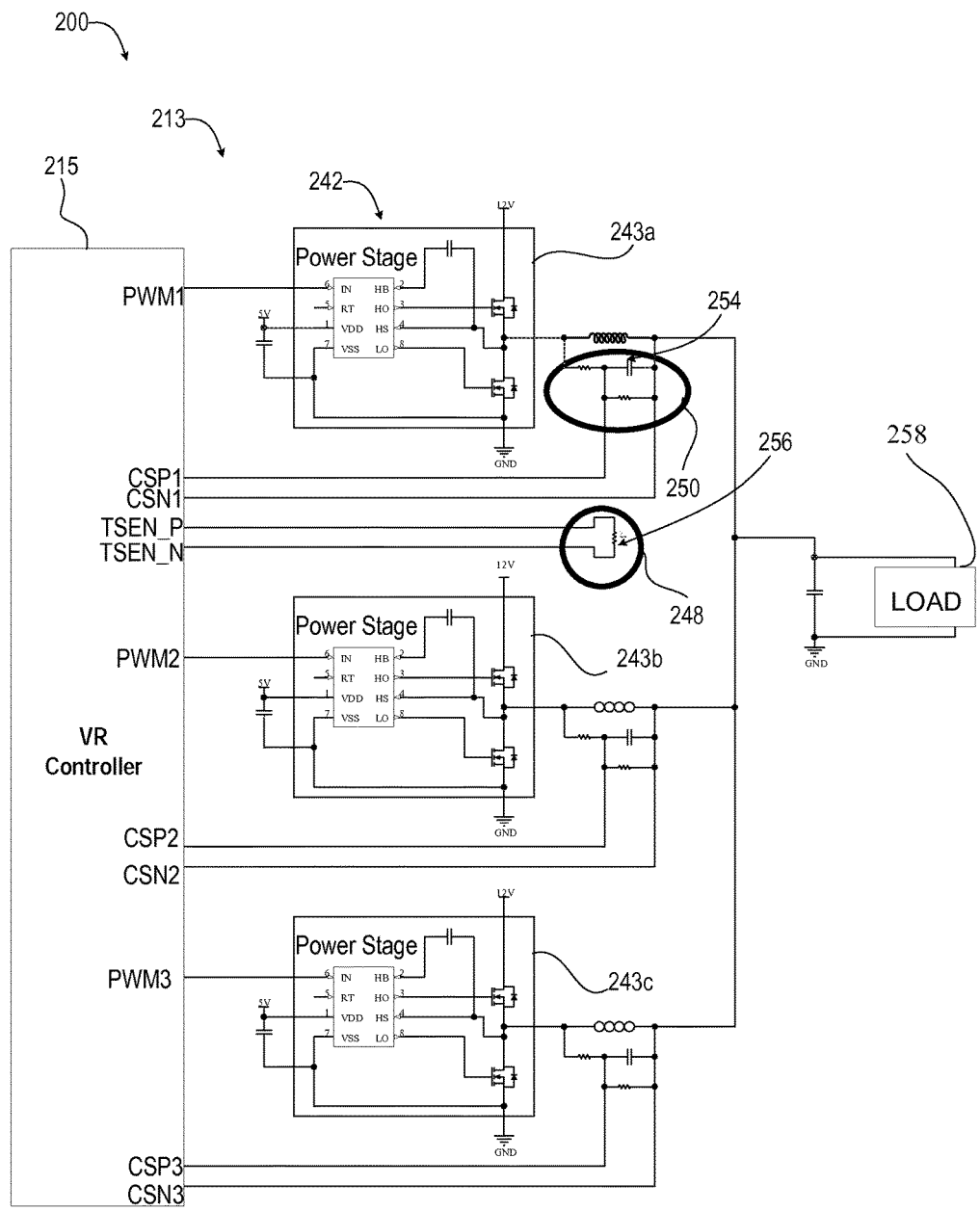
FIG. 2 illustrates a schematic diagram of an example IHS having a multi-phase VR module, according to one or more embodiments.

FIG. 2 illustrates an IHS 200 having a multi-phase VR module 213 having a Pstage 242 that includes three phases 243a-243c controlled by a VR controller 215. The VR module 213 incorporates a current sensor 250 that includes an inductor 254 for DCR sensing. The VR module 213 incorporates a temperature sensor 248 for temperature compensation using a thermistor 256. Considering second source parameter mismatch and additional tolerance from soldering, actual DCR tolerance (TOL) used for current sense may be up to 8%, given a 5% TOL inductor. In an exemplary embodiment, an 0.29 mohm±5% inductor is used. In order to achieve higher efficiency, a lower DCR inductor is preferred. However, a lower DCR value may significantly impact signal-noise ratio and thus result in worse Imon accuracy. In order to thermally compensate temperature impact on current sense through DCR, a centralized NTC resistor is usually placed at a location that best represents inductor DCR temperature variance. However, having only one thermistor at a single location cannot cover each phase temperature variation. The VR module 213 provides voltage-regulated power to a load 258, which can be an adjustable test load during development of the empirical database 117 or a computing component such as the processor 112 (FIG. 1).

Figure 3:
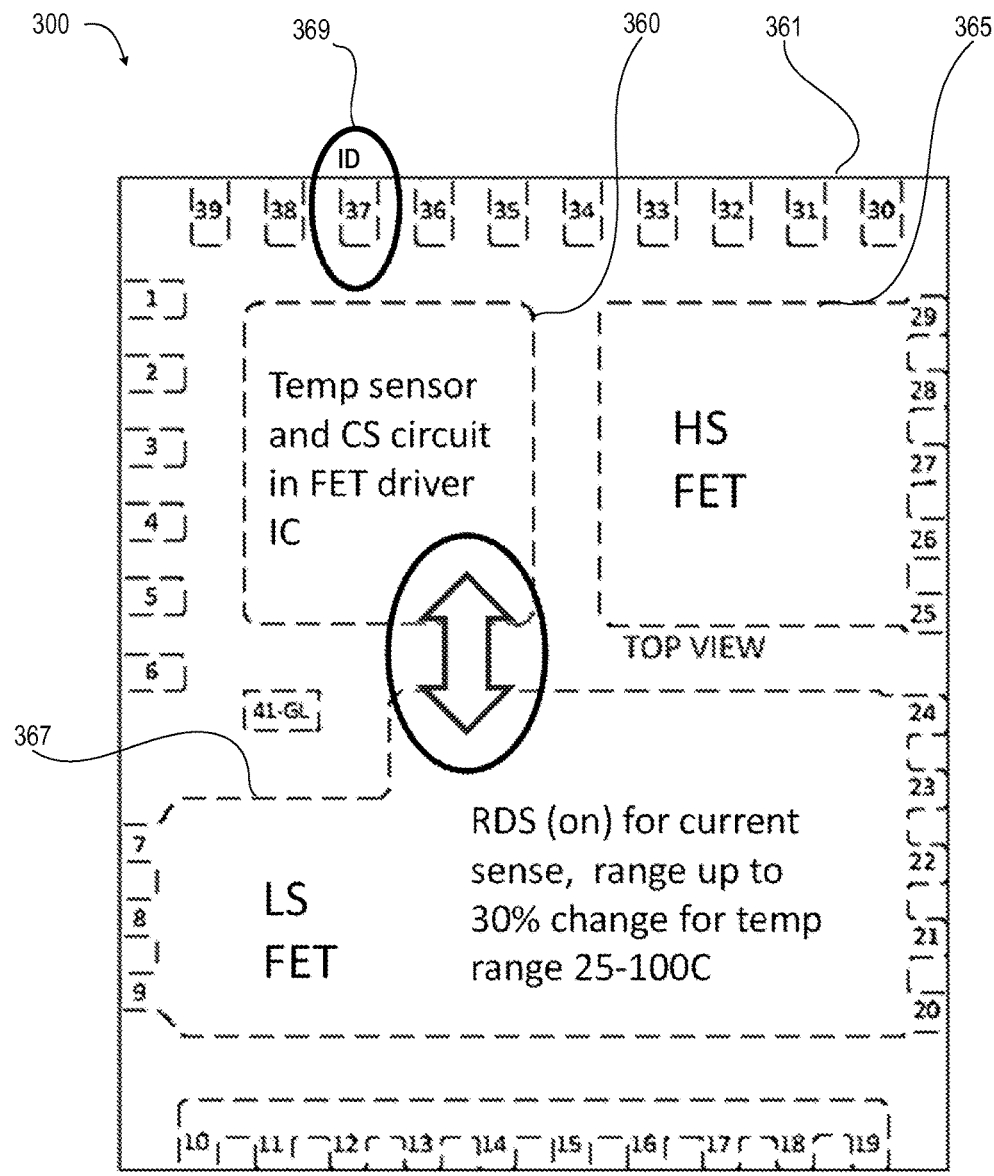
FIG. 3 illustrates a diagram of a quad packaged VR module incorporating current sense and temperature compensation, according to one or more embodiments.

FIG. 3 illustrates an example IHS 300 having a multi-phase Pstage 300 with integrated MOSFET RDS (on) current sense and temperature compensation. RDS (on) is the total resistance between the source and the drain during the on state for the MOSFET transistor. The present innovation discloses a high-density VR design using highly integrated smart power stage (SPS or Pstage) with embedded current-sense and temperature sense inside driver IC. In an exemplary embodiment, FIG. 3 illustrates, as a cost-effective approach, three generally-known IC dies that are integrated in one Power Quad Flat No-lead (PQFN) package 361. Pstage 300 bring benefits to design, such as stronger current sensed signal, higher efficiency, and higher power density for future high performance VR design. Usually, current sense (Imon) gain and offset trimming completed in silicon Automated Test Equipment (ATE) is implemented only under normal/fixed condition such as room temperature. However, low-side (LS) MOSFET RDS (on) being used for current sense may vary up to 30% as temperature changes from 25 C to 100 C. Therefore, temperature compensation becomes a key factor in actual Imon accuracy for an operating VR. Other portions of the VR module 213 such as the VR controller 215 (FIG. 2) are in electronic communication with the Pstage 300 but can be separate from the PQFN package 361.

Unfortunately, temperature variation range (typically, 25 C-110 C) for an operating MOSFET die is usually greater than the range (typically, 25 C-50 C) of an inductor winding DCR, due to a larger power loss on MOSFET die. For example, the power loss for MOSFET can be approximately 3 W versus the power loss for the inductor winding DCR of approximately 0.2 W when VR operating at 120A. When temperature sensor and current sense (CS) circuit 360 is placed with MOSFET driver IC 365, which is in another silicon die, temperature coupling coefficient between temperature sensor 248 (FIG. 2) and low side field effect transistor (LSFET) 367 is nonlinear. As a result, it is difficult to use only one consistent temperature coupling coefficient to cover whole VR operation range up to Iccmax (maximum transistor collector current) from design considerations of different vendor silicon (Si) processes and packaging, as well as board layout/stock-up differences and operation conditions such as thermal and noisy coupling on a specific planar. Pstage 300 includes an identifier data output 369.

Figure 4:
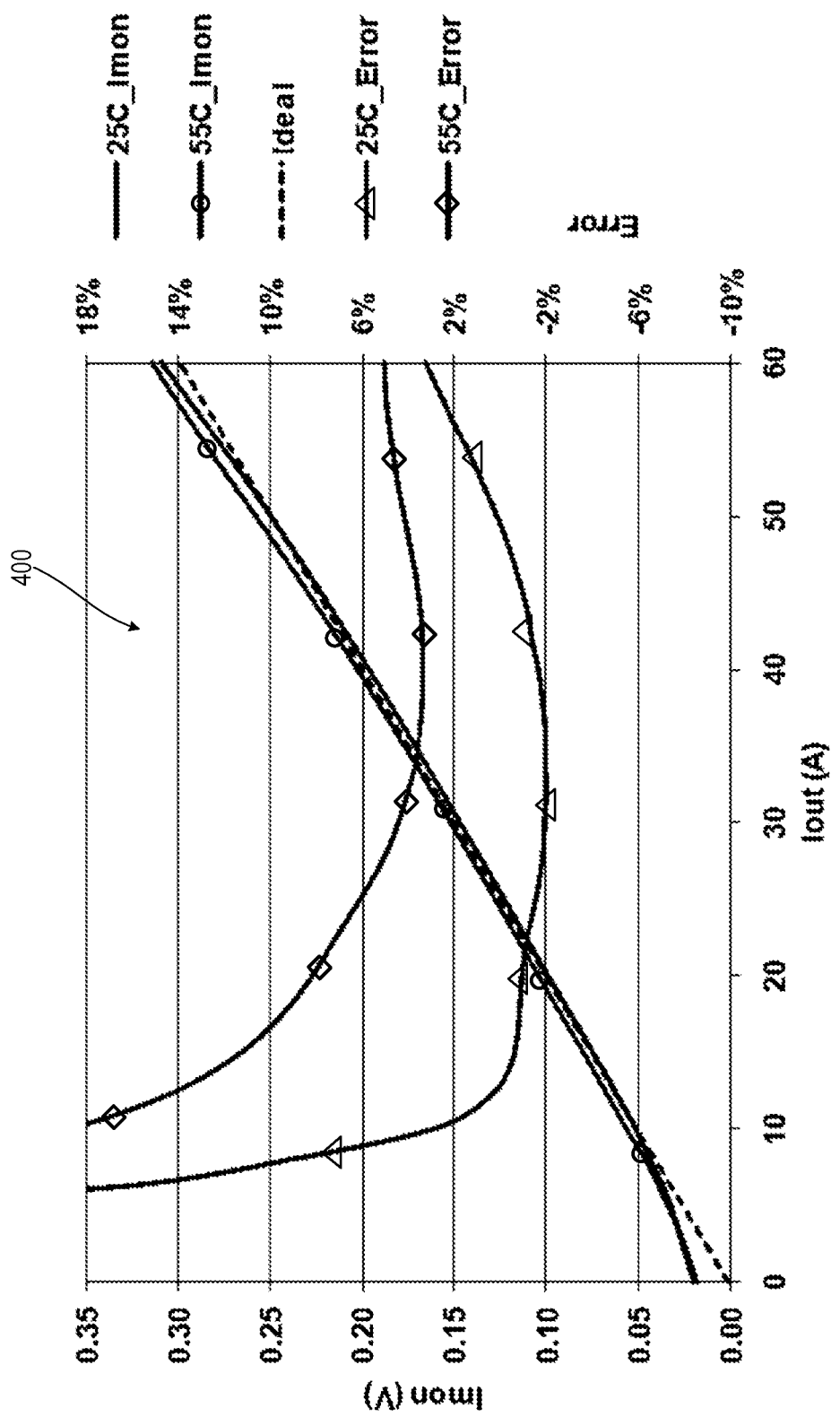
FIG. 4 illustrates a graph depicting test data of a power stage of an IHS, according to one or more embodiments.

FIG. 4 illustrates a graph 400 of test data of Pstage, illustrating Imon inaccuracy caused by temperature coupling coefficient and temperature compensation for RDS (on). Although gain and offset are trimmed under a typical operation condition, Imon accuracy issue is caused by temperature coupling coefficient and undesired temperature compensation. Imon error is in an acceptable range under 25 C. But the error is beyond the spec 4% under 55 C while practical operation temperature may be up to 100 C.

Figure 5:
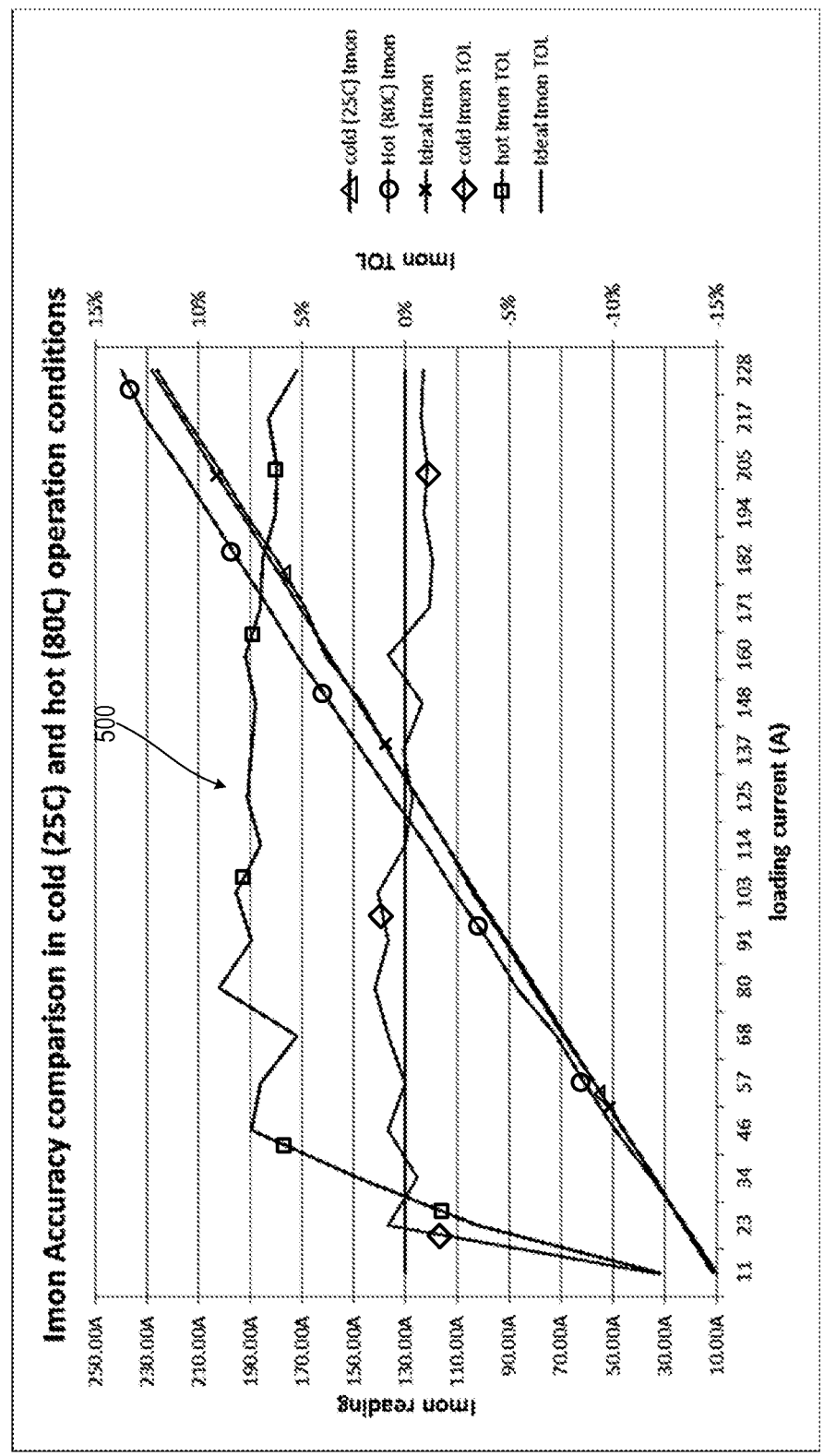
FIG. 5 is a graph illustrating accuracy of test data of monitored output current of a VR module as a function of temperature, according to one or more embodiments.

FIG. 5 illustrates a graph 500 of Imon accuracy test data on DELL 14G VR board in cold (~25 C) and hot (~80 C) conditions. Imon reading in cold 25 C condition is very close to ideal Imon curve. However, Imon error is up to 7% when VR temperature reaches about 80 C. In the past, significant effort has been made on current sense Imon accuracy improvement by calibration. Appreciation was not given to how temperature is impacting an actual Imon reading for an operating VR. In making technology transfer from discrete solution to integrated Pstage to use MOSFET RDS (on) sense, the above test data demonstrates a need to address Imon accuracy again due to nonlinear characteristics of actual Imon accuracy versus temperature compensation. Actual Imon with compensation for temperature change can realize target accuracy even if Imon in cold condition is zero error.

Figure 6:
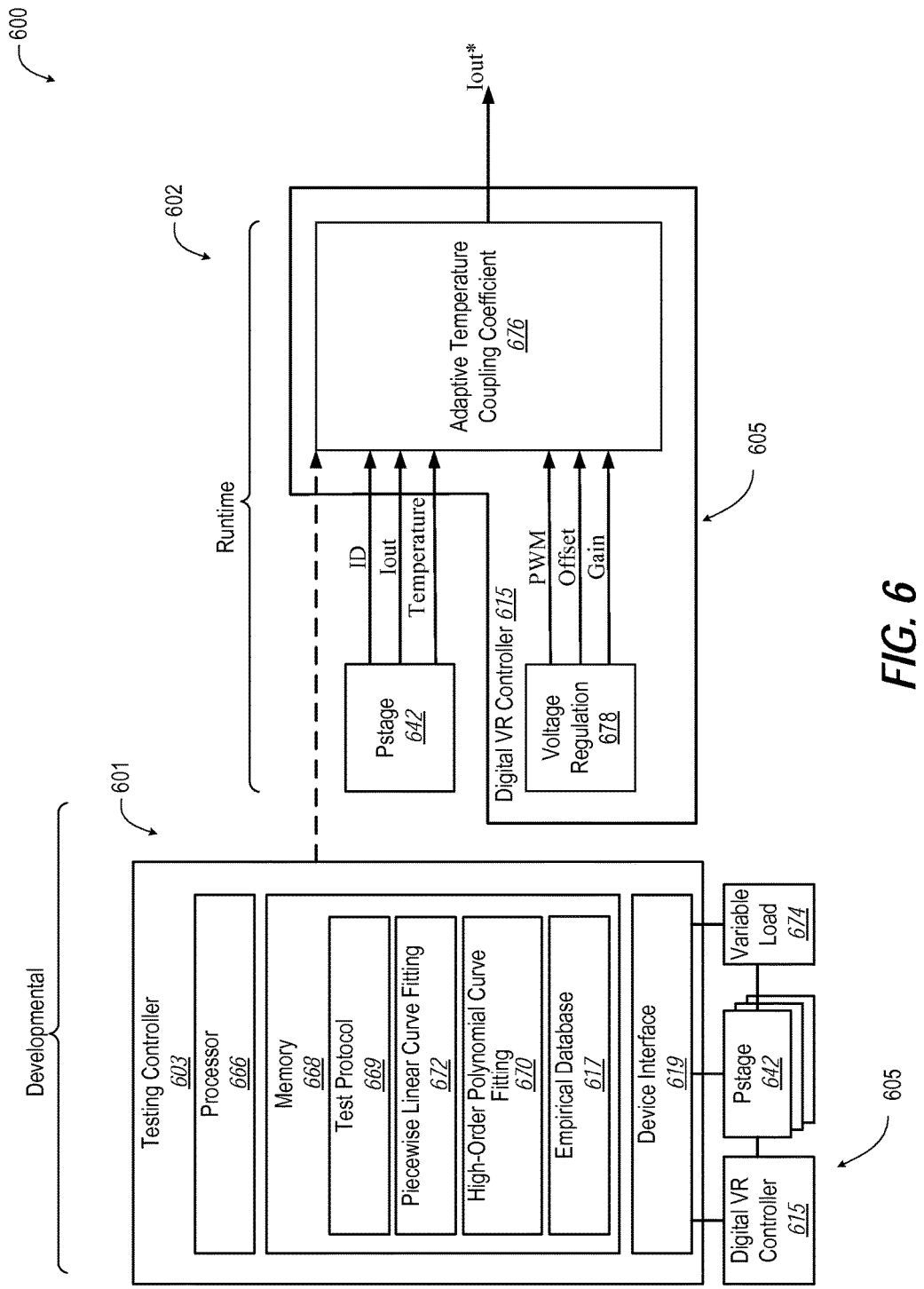
FIG. 6 illustrates a block diagram of a two-part system of a testing system for developing empirical data of real-time multi-dimensional temperature compensation to fine tune nonlinear segments of an Imon curve for use by a runtime system for an IHS, according to one or more embodiments.

FIG. 6 illustrates a two-part system 600 which includes a testing system 601 and a runtime system 602. The testing system 601 develops empirical data of real-time multi-dimensional temperature compensation to fine tune nonlinear segment of an Imon curve for the runtime system 602, such as the digital VR controller 115 of an IHS 100 (FIG. 1). A test controller 603 interfaces via a device interface 619 with one or more VR modules 605. In one or more embodiments, more than one type of VR module 605 are sequentially assembled for testing from a digital VR controller 615 and a selected type of Pstage 642. The digital VR controller 615 can begin without temperature compensation of Imon curve. The digital VR controller 615 provides attributes of the voltage-regulated power, such as PWM pulse width signal, offset signal, and gain signal, to the testing system 601 or the runtime system 602. Pstage 642 provides a vendor ID signal, an output current signal, and a temperature signal to the testing system 601.

The testing system 601 can include one or more processors 666 that access data and execute instructions contained in a memory 668, such as a test protocol 669. The testing system 601 can apply a variable load 674 to the VR module 605. In development phase, in one or more embodiments a first module 670 can calculate a high-order polynomial curve fit equation for adaptive coupling coefficients 676 based on empirical database 617. In one or more embodiments, a second module 672 can calculate a piecewise linear curve fitting equation based on empirical database 617, creating adaptive temperature coupling coefficients 676.

In a development phase, an empirical database 617 is processed by the first module 670 or the second module 672 to create a look-up table 700 (FIG. 7) for temperature coupling coefficients 676 (FIG. 6). The look-up table 700 can be constructed as a function of vendor ID and operation temperature. The look-up table 700 provides fined tuned temperature compensation for VR Imon across VR operation range, as shown in FIG. 7. Look-up table 700 lists pre-optimized temperature coefficients for different vendor's power stages (Pstage) versus vendor ID and temperature.

Returning to FIG. 6, in runtime phase, these real-time variables, as modified by the adaptive temperature coupling coefficients 676, will determine final Iout for a VR module 605. Based on received temperature signal from Pstage pin–Ts (temperature sense), digital VR controller 615 adjusts temperature difference between phases. A PWM voltage regulation control portion 678 of the digital VR controller 615 provides the PWM, gain and offset values. Then the digital VR controller 615 can use vendor Pstage ID and adjusted temperature as an index to upload a suitable temperature coupling coefficient to the operational register of each phase. In one or more embodiments, each phase of a multi-phase Pstage 642 can have a different temperature. The digital VR controller 615 can send only the highest temperature amongst the phases of the Pstage is sent to the digital VR controller 615.

Based on VR operation mechanism, MOSFET's RDS (on) is proportional to temperature of the die, which is proportional to PWM pulse width as power loss and power delivery are increased. The final constructed current Iout of VR can be determined by input variables such as Iout_ps, temperature from Pstage, PWM pulse width, and Imon sense offset and gain from digital controller.

Figure 8:
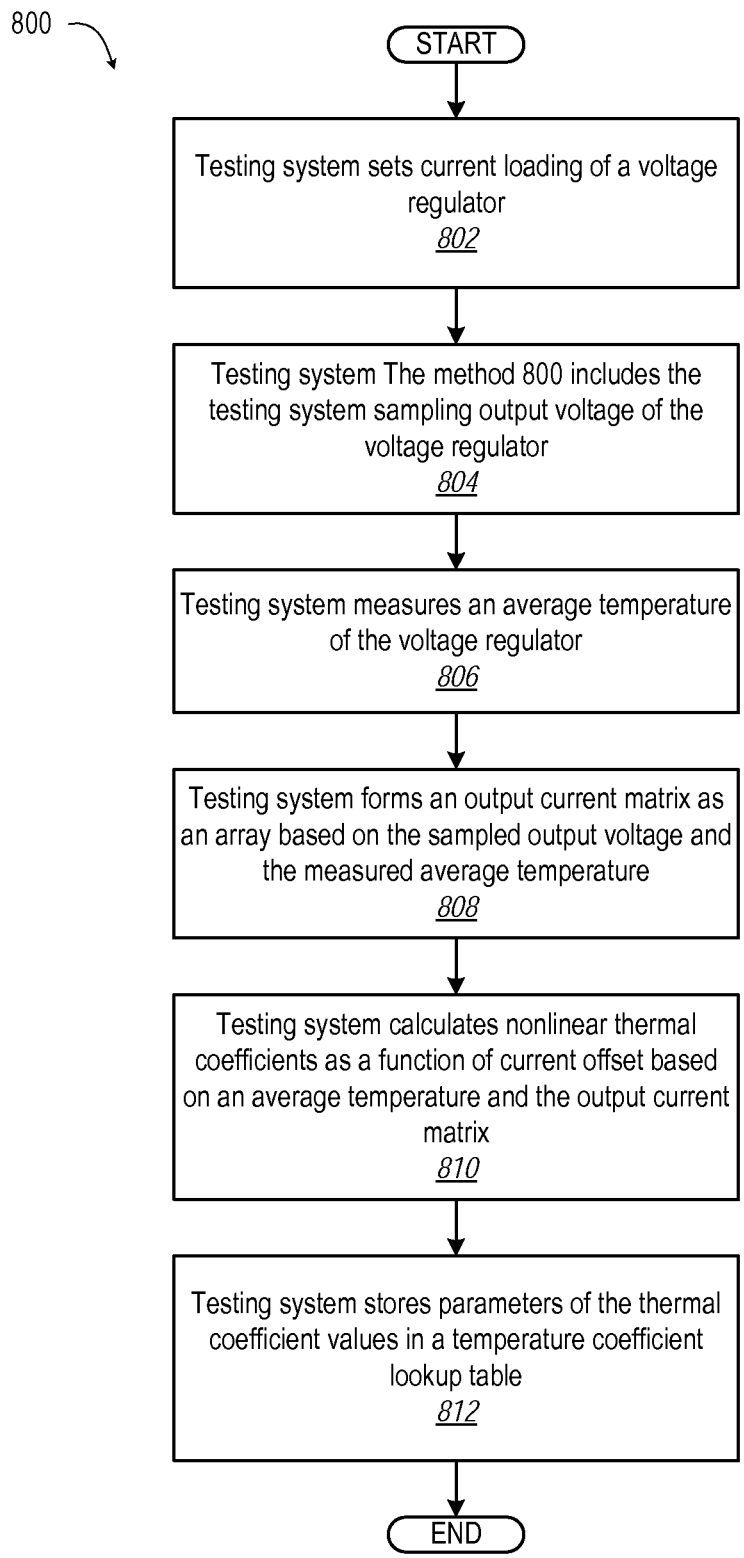
FIG. 8 illustrates a flow diagram of a method of deriving temperature compensation parameters for voltage regulation of an IHS, according to one or more embodiments.
Figure 9:
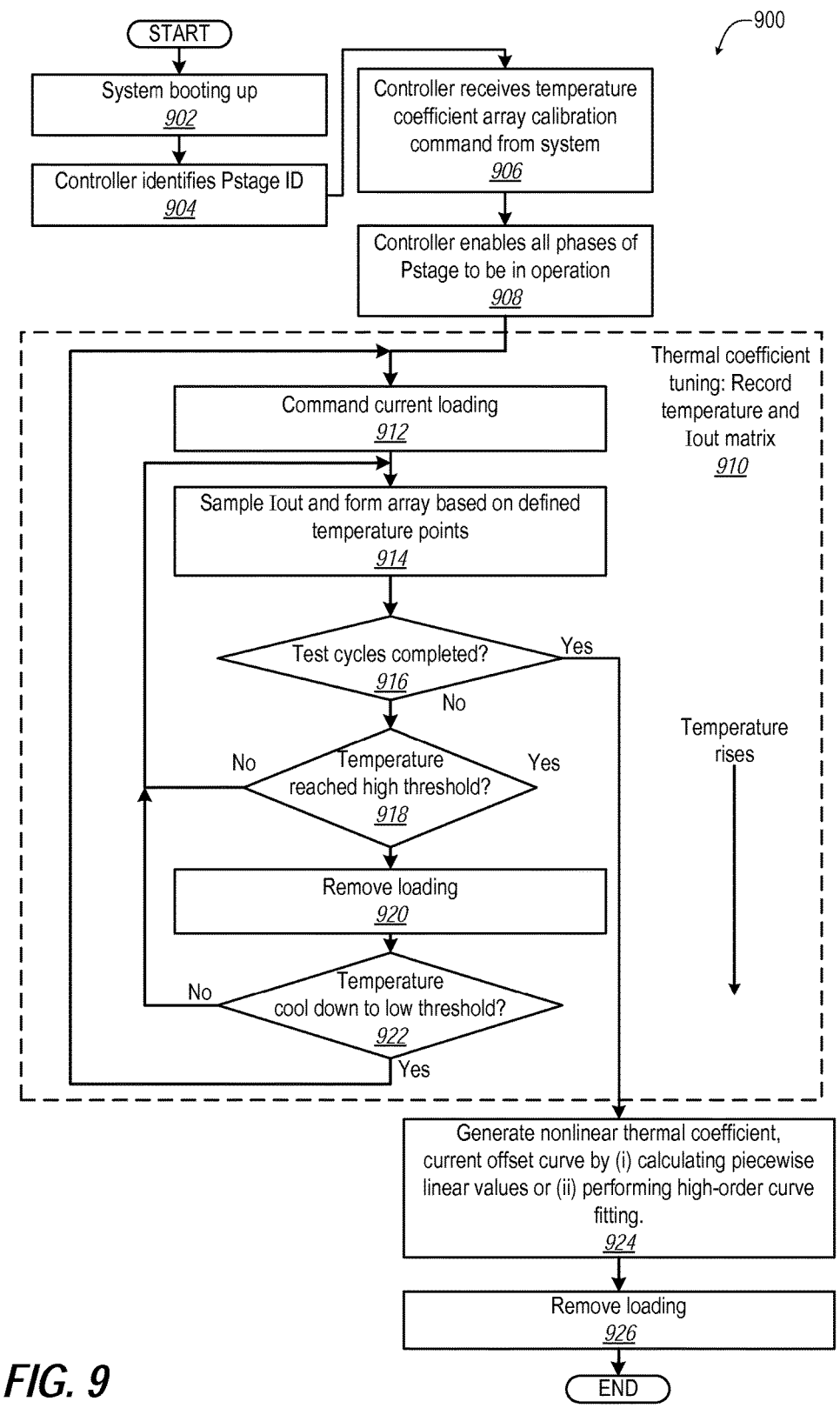
FIG. 9 illustrates a flow diagram of an example method of iteratively deriving temperature compensation parameters for voltage regulation of an IHS, according to one or more embodiments.
Figure 10:
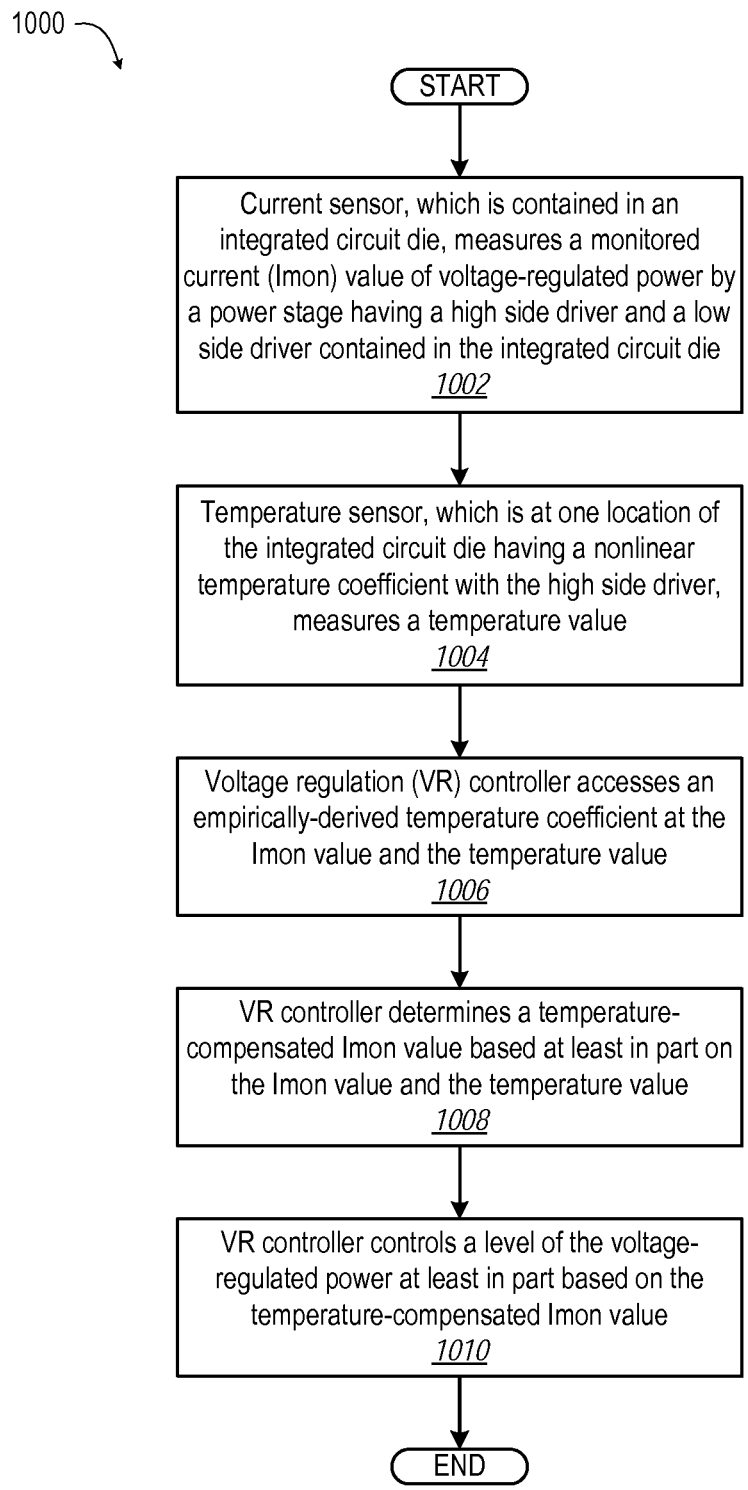
FIG. 10 illustrates a flow diagram of a method of temperature-compensated power control of an IHS, according to one or more embodiments.

FIGS. 8-9 illustrate flowcharts of exemplary methods 800, 900 by which an automated testing system 601 (FIG. 6) performs different aspects of the processes that enable the one or more embodiments of the disclosure. FIG. 10 illustrates flowchart of an exemplary method 1000 by which an IHS 100 (FIG. 1) performs different aspects of the processes that enable the one or more embodiments of the disclosure. Generally, methods 800, 900, 1000 represent computer-implemented methods. The description of methods 800, 900 is provided with general reference to the specific components illustrated within FIG. 6. Generally methods 800, 900 are described as being implemented via processor 666 (FIG. 6). The method 800 thereby determines empirical non-linear temperature coefficient data for a particular identity of power stage for VR control of other power stages of the same identity. The description of method 1000 is provided with general reference to the specific components illustrated within FIG. 1. Generally method 1000 is described as being implemented via VR controller 115 (FIG. 1). The method 1000 thereby uses empirical non-linear temperature coefficient data for a particular identity of power stage for VR control of other power stages of the same identity.

FIG. 8 illustrates a method 800 of deriving temperature compensation parameters for voltage regulation of an IHS. In one or more embodiments, the method 800 includes a testing system setting current loading of a voltage regulator (block 802). The method 800 includes the testing system sampling output voltage of the voltage regulator (block 804). The method 800 includes the testing system measuring an average temperature of the voltage regulator (block 806). The method 800 includes the testing system forming an output current matrix as an array, based on the sampled output voltage and the measured average temperature (block 808). The method 800 includes the testing system calculating nonlinear thermal coefficients as a function of current offset, based on an average temperature and the output current matrix (block 810). The method 800 includes the testing system storing parameters of the thermal coefficient values in a temperature coefficient lookup table (block 812). Then method 800 ends.

FIG. 9 illustrates an example method 900 of iteratively deriving temperature compensation parameters for voltage regulation of an IHS. In one or more embodiments, the method 900 includes a testing system booting up (block 902). VR controller identifies an identifier (ID) for a power stage (Pstage) (block 904). VR controller receives temperature coefficient array calibration command from the testing system (block 906). VR controller enables all phases of a multi-phase VR module to be in operation (block 908). Testing system performs an iterative process in either one cycle or repeated cycles for thermal coefficient tuning begins to record temperature and Iout matrix (block 910). In one embodiment, as provided within block 910, the method 900 includes the testing system commanding a current loading (block 912). For example, the command can couple a resistor network across the VR module. The IC die temperature of the VR module continues to rise across an operating temperature range as sample values are empirically captured. Testing system samples output current (Iout) and forms an array based on defined temperature points (block 914). Testing system makes a determination as to whether the test cycles have been completed (decision block 916). In response to a determination in decision block 916 that the test cycles have not been completed, testing system makes a further determination as to whether a sensed temperature has reach a high threshold that exceeds a testing range (decision block 918). In response to a determination in decision block 918 that the high threshold has not been reached, then method 900 returns to block 914 to continue sampling Iout and forming the array. In response to a determination in decision block 918 that the high threshold has been reached, then method 900 includes removing loading of the VR module (block 920). Testing system makes a determination as to whether a sensed temperature has cooled down below a low threshold that is below a testing range (decision block 922). In response to a determination in decision block 922 that the temperature is below the low threshold, method 900 returns to block 912 to command current loading. In response to a determination in decision block 922 that the temperature is not below the low threshold, method 900 returns to block 914 to continue sampling and forming the array. In response to a determination in decision block 916 that the defined one or more test cycles have been completed, testing system generates a nonlinear thermal coefficient, current offset curve by performing one of (i) calculating piecewise linear values to extrapolate between the sampled values or (ii) performing high-order polynomial curve fitting to extrapolate between the sampled values (block 924). Testing system removes loading of the VR module (block 926). Then method 900 ends.

FIG. 10 illustrates a method 1000 of temperature-compensated power control of an IHS. In one or more embodiments, the method 1000 includes a current sensor, which is contained in an integrated circuit die, measuring a monitored current (Imon) value of voltage-regulated power by a power stage. The power stage has a high side driver and a low side driver contained in the integrated circuit die (block 1002). The method 1000 includes a temperature sensor, which is at one location of the integrated circuit die that has a nonlinear temperature coefficient with the high side driver, measuring a temperature value (block 1004). The method 1000 includes a VR controller retrieving an empirically-derived temperature coefficient at the Imon value and the temperature value (block 1006). The method 1000 includes the VR controller determining a temperature-compensated Imon value based at least in part on the Imon value and the temperature value (block 1008). The method 1000 includes the VR controller controlling a level of the voltage-regulated power at least in part based on the temperature-compensated Imon value (block 1010). Then method 1000 ends.

In the above described flow charts of FIG. 8-10, one or more of the methods may be embodied in an automated power controller that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An Information Handling System (IHS) having temperature-compensated power control, the IHS comprising:
   a computing component;
   a voltage regulation (VR) module comprising:
      an integrated circuit die;
      a power stage component contained in the integrated circuit die and comprising a high side driver and a low side driver both electrically connected to power the computing component with voltage-regulated power;
      a current sensor contained in the integrated circuit die to measure a monitored current (Imon) value of the voltage-regulated power; and
      a temperature sensor contained in the integrated circuit die and which measures a temperature value at one location of the integrated circuit die, wherein the temperature value sensed at the location has a nonlinear temperature coefficient relationship with a second temperature of the high side driver; and
   a VR controller in communication with the current sensor and the temperature sensor and which executes instructions that configure the VR controller to:
      receive the Imon value from the current sensor;
      receive the temperature value from the temperature sensor;
      determine a temperature-compensated Imon value based at least in part on the Imon value, the temperature value, and an empirically-derived temperature coefficient defined at the Imon value and the temperature value, the empirically-derived temperature coefficient being determined by a testing phase wherein a testing system:
         identifies an identifier (ID) for a power stage (Pstage) of the integrated circuit;
         performs an iterative process for thermal coefficient tuning, which records temperature and an Iout matrix;
         empirically captures sample values as an integrated circuit die temperature of the VR module continues to rise across an operating temperature range of the VR module;
         samples output current (Iout) and forms an output current matrix as an array, based on sampled output voltage and defined temperature points; and
         in response to completion of the iterative process, generates, by the testing system, a nonlinear thermal coefficient, current offset curve by performing one of: (i) calculating piecewise linear values to extrapolate between sampled values stored within an empirical database; or (ii) performing high-order polynomial curve fitting to extrapolate between the sampled values within the empirical database, wherein the empirical database is processed to create a look-up table that stores temperature coupling coefficients that provides fine-tuned temperature compensation for Imon across a VR operation range; and control the voltage-regulated power at least in part based on the temperature-compensated Imon value determined at least in part by the empirically-derived temperature coefficient.

2. The IHS of claim 1, wherein the VR controller executes instructions to configure the IHS to:

determine an identifier of a type of voltage regulator module; and determine the temperature-compensated Imon value based at least in part on the identifier.

3. The IHS of claim 1, wherein:

the current sensor comprises an inductor Direct Current Resistance (DCR) sense circuit; and the temperature sensor comprises a thermistor.

4. The IHS of claim 1, wherein:

the power stage component generates voltage-regulated power that includes a pulse width modulated (PWM) signal at a selected offset and a selected gain; and the VR controller executes instructions that configures the VR controller to:

receive the PWM signal, the selected offset, and the selected gain from the power stage component; and determine the temperature-compensated Imon value based at least in part on the PWM signal, the selected offset, and the selected gain received from the power stage component.

5. The IHS of claim 1, wherein:

the high side driver and the low side driver each comprise a metal-oxide-semiconductor field-effect transistors (MOSFET); and the temperature sensor is contained in the integrated circuit die at a location proximate to the MOSFET of the low side driver.

6. The IHS of claim 1, wherein the VR controller retrieves a look-up table and determines the temperature-compensated Imon value by utilizing the look-up table.

7. The IHS of claim 1, wherein the empirically-derived temperature coefficient adjusts for nonlinear portions of a temperature coupling relationship between a portion of the integrated circuit (IC) die that can include the current sensor and the temperature sensor and a temperature experienced by an active portion of the VR module.

8. The IHS of claim 1, wherein the VR controller performs temperature compensation for a particular configuration of the VR module, wherein the VR controller:

retrieves a pre-optimized empirical database;

receives multiple variables in order to select a coefficient from the pre-optimized empirical database; and determines adaptive temperature coupling coefficients to achieve temperature compensation characteristics to calibrate a nonlinear segment of monitored current (Imon) curve in a heavy load range.

9. A method of performing temperature-compensated power control of an information handling system (IHS), the method comprising:

measuring, by a current sensor contained in an integrated circuit die, a monitored current (Imon) value of voltage-regulated power by a power stage having a high side driver and a low side driver contained in the integrated circuit die;

measuring a temperature value using a temperature sensor at one location of the integrated circuit die having a nonlinear temperature coefficient with the high side driver;

retrieving an empirically-derived temperature coefficient at the Imon value and the temperature value, the empirically-derived temperature coefficient being determined by a testing phase comprising:

identifying an identifier (ID) for a power stage (Pstage) of the integrated circuit;

performing, by a testing system, an iterative process for thermal coefficient tuning, which records temperature and an Iout matrix;

empirically capturing sample values as an integrated circuit die temperature of the VR module continues to rise across an operating temperature range of the VR module;

sampling, by the testing system, output current (Iout);

forming an array based on defined temperature points; and in response to completion of the iterative process, generating, by the testing system, a nonlinear thermal coefficient, current offset curve by performing one of: (i) calculating piecewise linear values to extrapolate between sampled values stored within an empirical database; or (ii) performing high-order polynomial curve fitting to extrapolate between the sampled values within the empirical database, wherein the empirical database is processed to create a look-up table for temperature coupling coefficients that provides fine-tuned temperature compensation for Imon across a VR operation range;

determining a temperature-compensated Imon value based at least in part on the Imon value and the temperature value; and controlling a level of the voltage-regulated power at least in part based on the temperature-compensated Imon value determined at least in part by the empirically-derived temperature coefficient.

10. The method of claim 9, further comprising:

determining an identifier for a selected type of voltage regulator module characterized by a particular nonlinear temperature coefficient; and determining the temperature-compensated Imon value based at least in part on the identifier.

11. The method of claim 9, wherein:

the current sensor comprises an inductor Direct Current Resistance (DCR) sense circuit; and the temperature sensor comprises a thermistor that detects the temperature value.

12. The method of claim 9, further comprising:

generating voltage-regulated power comprising a pulse width modulated (PWM) signal at a selected offset and a selected gain; and determining the temperature-compensated Imon value based at least in part on the PWM signal, the selected offset, and the selected gain from the power stage component.

13. The method of claim 9, wherein:

the high side driver and a low side driver each comprise a metal-oxide-semiconductor field-effect transistor (MOSFET); and the temperature sensor is contained in the integrated circuit die at a location proximate to the MOSFET of the low side driver.

14. The method of claim 9, further comprising:

retrieving a temperature coupling coefficient look-up table; and determining the temperature-compensated Imon value utilizing the temperature coupling coefficient look-up table.

15. The method of claim 9, further comprising deriving temperature compensation parameters for voltage regulation of the information handling system (IHS), the deriving temperature compensation parameters comprising:

the testing system:
- setting current loading of a voltage regulator;
- sampling output voltage of the voltage regulator;
- measuring an average temperature of the voltage regulator;
- forming an output current matrix as an array based on the sampled output voltage and the average temperature;
- calculating nonlinear thermal coefficients as a function of current offset based on the average temperature and the output current matrix; and
- storing parameters of the thermal coefficient values in the look-up table.

16. The method of claim 15, further comprising provisioning a digital controller of a voltage regulation module with the nonlinear thermal coefficients.

* * * * *